(12) United States Patent
Suzuki (10) Patent No.: US 12,222,734 B2
(45) Date of Patent: Feb. 11, 2025

(54) CONTROL APPARATUS, NON-TRANSITORY COMPUTER READABLE MEDIUM, AIRCRAFT, SYSTEM, AND OPERATING METHOD OF SYSTEM

(71) Applicant: TOYOTA JIDOSHA KABUSHIKI KAISHA, Toyota (JP)

(72) Inventor: Shotaro Suzuki, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 254 days.

(21) Appl. No.: 18/047,083

(22) Filed: Oct. 17, 2022

(65) Prior Publication Data

US 2023/0121122 A1 Apr. 20, 2023

(30) Foreign Application Priority Data

Oct. 18, 2021 (JP) .................. 2021-170428

(51) Int. Cl.

| | | |
|---|---|---|
| G01D 1/10 | (2006.01) | |
| B60L 58/12 | (2019.01) | |
| B64D 27/24 | (2006.01) | |
| G05D 1/00 | (2006.01) | |
| H01M 10/42 | (2006.01) | |
| H01M 10/44 | (2006.01) | |
| H02J 7/00 | (2006.01) | |

(52) U.S. Cl.
CPC .............. *G05D 1/106* (2019.05); *B60L 58/12* (2019.02); *B64D 27/24* (2013.01); *G05D 1/0016* (2013.01); *H01M 10/425* (2013.01); *H01M 10/44* (2013.01); *H02J 7/00032* (2020.01); *H02J 7/0048* (2020.01); *H02J 7/00712* (2020.01); *H02J 7/007188* (2020.01); *G05D 1/0022* (2013.01); *H01M 2220/20* (2013.01)

(58) Field of Classification Search
CPC ........... G01D 1/00; B60L 53/62; B60L 58/12; B64D 27/24; G01C 21/26; G01C 21/20
See application file for complete search history.

(56) References Cited

U.S. PATENT DOCUMENTS

| | | | |
|---|---|---|---|
| 2017/0267343 A1* | 9/2017 | Chen ................ | G06Q 10/08355 |
| 2019/0114929 A1 | 4/2019 | Sasaki | |
| 2022/0236747 A1* | 7/2022 | Tanaka .................. | B64U 50/19 |
| 2022/0357162 A1* | 11/2022 | Okuda ................. | G08G 1/0969 |
| 2023/0035476 A1* | 2/2023 | Yamamoto ............. | G01C 21/34 |
| 2024/0174113 A1* | 5/2024 | Dutt ........................ | B60L 55/00 |

FOREIGN PATENT DOCUMENTS

| | | |
|---|---|---|
| JP | 2013-090360 A | 5/2013 |
| JP | 2019-032661 A | 2/2019 |
| JP | 6480088 B1 | 3/2019 |
| JP | 2019-073056 A | 5/2019 |
| JP | 2020-000831 A | 1/2020 |
| JP | 2020-012695 A | 1/2020 |
| JP | 2020-067879 A | 4/2020 |

* cited by examiner

*Primary Examiner* — Tan Q Nguyen
(74) *Attorney, Agent, or Firm* — Oliff PLC (57) ABSTRACT

A control apparatus includes a memory storing information on power consumption for flight of an aircraft flying by an electric rotor and a controller configured to instruct the aircraft to fly on a flight path passing through a power supply facility based on a remaining charge of the aircraft and the power consumption according to flight conditions when the aircraft flies to a destination.

20 Claims, 8 Drawing Sheets

CONTROL APPARATUS, NON-TRANSITORY COMPUTER READABLE MEDIUM, AIRCRAFT, SYSTEM, AND OPERATING METHOD OF SYSTEM

CROSS-REFERENCE TO RELATED APPLICATION

This application claims priority to Japanese Patent Application No. 2021-170428, filed on Oct. 18, 2021, the entire contents of which are incorporated herein by reference.

TECHNICAL FIELD

The present disclosure relates to a control apparatus, a non-transitory computer readable medium, an aircraft, a system, and an operating method of a system.

BACKGROUND

Vehicles driven by electric power discharged from batteries, such as Battery Electric Vehicles (BEVs) and electric Vertical Take Off and Landing (eVTOL), are known. Various forms of technology have also been proposed to manage the efficient charging and discharging of batteries. For example, Patent Literature (PTL) 1 discloses technology to control charging based on the temperature and degree of degradation of a battery.

CITATION LIST

Patent Literature

PTL 1: JP 2020-000831 A

SUMMARY

In eVTOLs and other aircraft, battery charging and discharging needs to be performed in a reasonable manner.

The present disclosure provides a control apparatus and the like that reasonably manages the charging and discharging of the battery of an aircraft.

A control apparatus according to the present disclosure includes:
  a memory storing information on power consumption for flight of an aircraft flying by an electric rotor; and
  a controller configured to instruct the aircraft to fly on a flight path passing through a power supply facility based on a remaining charge of the aircraft and the power consumption according to flight conditions when the aircraft flies to a destination.

A system according to the present disclosure includes an aircraft flying by an electric rotor and a control apparatus communicating with the aircraft, wherein
  the control apparatus includes a memory storing information on power consumption for flight of the aircraft and a controller configured to instruct the aircraft to fly on a flight path passing through a power supply facility based on a remaining charge of the aircraft and the power consumption according to flight conditions when the aircraft flies to a destination, and
  the aircraft flies based on an instruction from the controller.

An operating method of a system according to the present disclosure is an operating method of a system including an aircraft flying by an electric rotor and a control apparatus communicating with the aircraft, the operating method including:
  storing, by the control apparatus, information on power consumption for flight of the aircraft and instructing the aircraft to fly on a flight path passing through a power supply facility based on a remaining charge of the aircraft and the power consumption according to flight conditions when the aircraft flies to a destination; and
  flying, by the aircraft, based on an instruction from the control apparatus.

According to the control apparatus and the like of the present disclosure, the charging and discharging of the battery of an aircraft can be reasonably managed.

DETAILED DESCRIPTION

Embodiments are described below.

Figure 1:
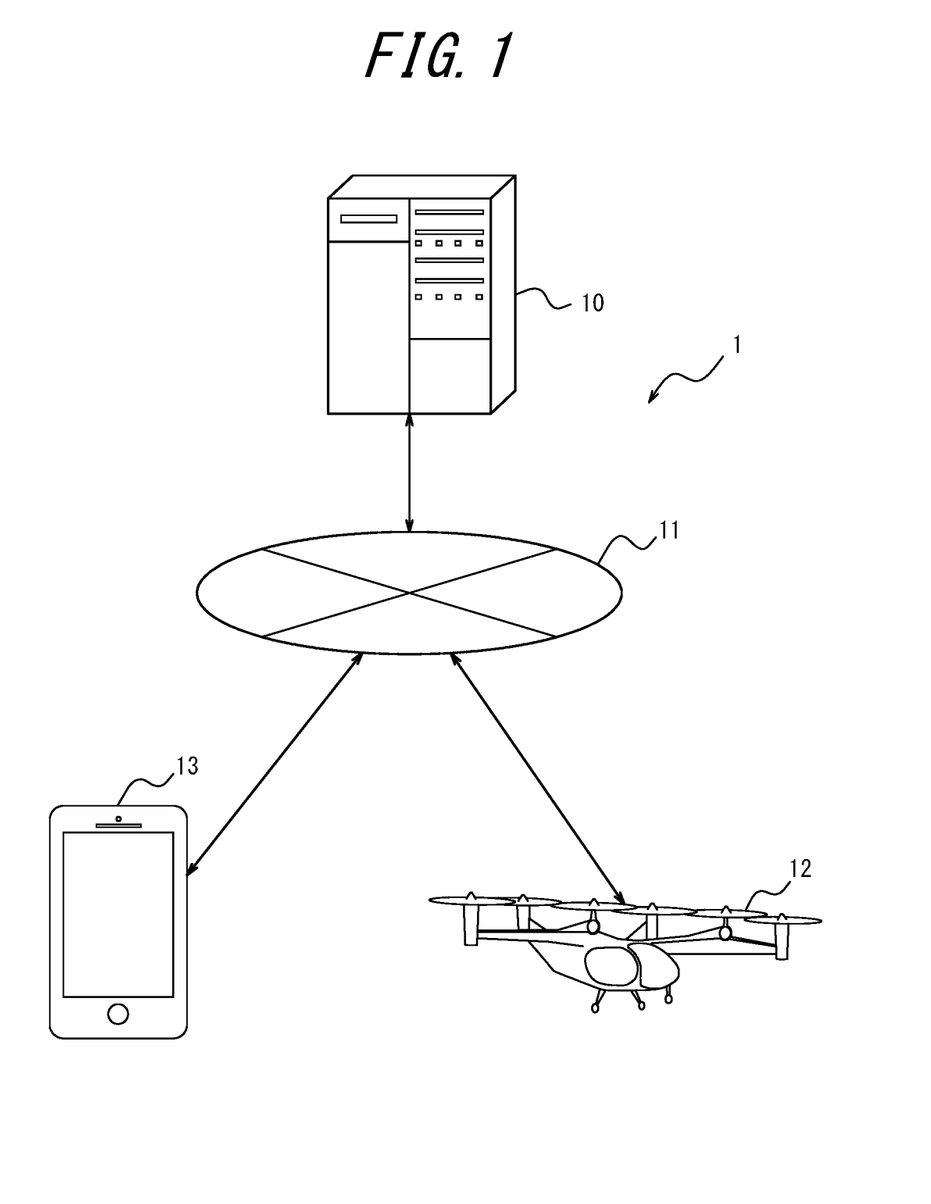
FIG. 1 is a diagram illustrating an example configuration of an operation management system.

FIG. 1 is a diagram illustrating a configuration example of an operation management system according to an embodiment. An operation management system 1 is a system that manages operation of aircraft that transport passengers on demand. The operation management system 1 includes one or more each of a server apparatus 10, an aircraft 12, and a terminal apparatus 13 communicably connected to each other via a network 11.

The server apparatus 10 is, for example, a server computer that belongs to a cloud computing system or other computing system and functions as a server that implements various functions. The server apparatus 10 is used by a provider that provides operational services with the aircraft 12.

The aircraft 12 has a cabin similar in size to that of a passenger car, capable of accommodating one or more occupants, and a mechanism including one or more electric rotors for generating lift and thrust. The aircraft 12 is an aircraft piloted at least partially by visual flight rules (VFR), such as an eVTOL. The aircraft 12 has a drive mechanism, including a motor, to drive the electric rotors, a corresponding control apparatus, and a battery to supply electric power to the drive mechanism. The battery is, for example, a lithium-ion battery. The aircraft 12 may be piloted by instrument flight rules (IFR). The aircraft 12 is provided with communication functions and information processing functions and is connected to the network 11 via a mobile communication network.

The terminal apparatus 13 is an information processing apparatus provided with communication functions, is used by a passenger aboard the aircraft 12, and performs various information communication and information processing. The terminal apparatus 13 is, for example, an information processing terminal such as a smartphone or a tablet terminal.

The network 11 may, for example, be the Internet or may include an ad hoc network, a local area network (LAN), a metropolitan area network (MAN), other networks, or any combination thereof.

In the operation management system 1, the server apparatus 10 corresponds to a "control apparatus". The server apparatus 10 includes a memory that stores information on the power consumption for flight of the aircraft 12 that flies by the electric rotor. The server apparatus 10 includes a controller that instructs the aircraft 12 to fly on a flight path passing through a power supply facility based on the remaining charge of the aircraft 12 and the power consumption according to flight conditions when the aircraft 12 flies to the destination.

Due to the need to reduce weight, a battery with a relatively small volume is mounted in the aircraft 12. The amount of a full charge is constrained by the volume of the battery, resulting in frequent charging and discharging of the battery. Such frequent charging and discharging of the battery can easily lead to battery degradation, and in particular, fast charging near 100% or 0% may accelerate battery degradation. On the other hand, the motor that drives the rotor of the aircraft 12 is subjected to different loads depending on the flight conditions of the aircraft 12. The power consumption therefore varies. According to the present embodiment, the flight path is set so that the aircraft 12 can be charged at the power supply facility at an appropriate timing based on the remaining charge of the battery of the aircraft 12 and the power consumption according to flight conditions when the aircraft 12 operates. The charging and discharging of the battery of an aircraft can thus be reasonably managed. In turn, charging and discharging that needlessly accelerates the degradation of the battery of the aircraft 12 is avoided, thereby maintaining the aircraft 12 in a good operating state.

Figure 2:
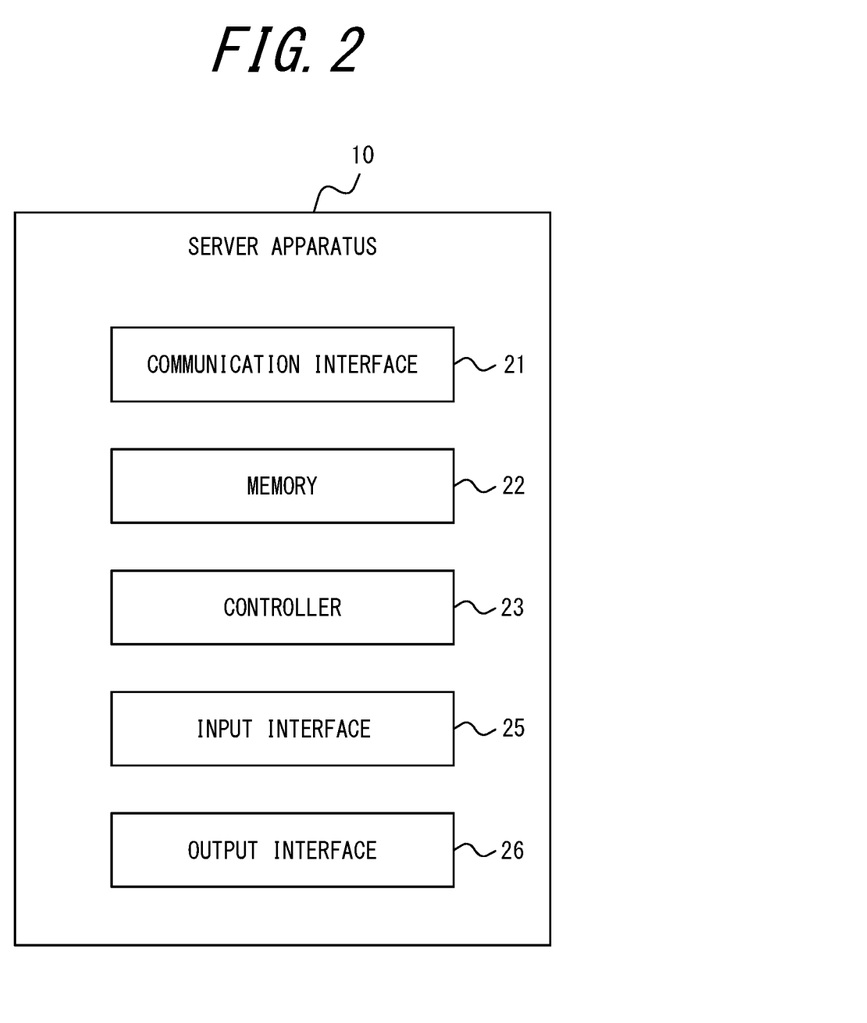
FIG. 2 is a diagram illustrating an example configuration of a server apparatus.

FIG. 2 illustrates an example configuration of the server apparatus 10. The server apparatus 10 includes a communication interface 21, a memory 22, a controller 23, an input interface 25, and an output interface 26. The server apparatus 10 is, for example, a single computer. The server apparatus 10 may be two or more computers that are communicably connected to each other and operate in cooperation. In this case, the configuration illustrated in FIG. 2 can be arranged among two or more computers as appropriate.

The communication interface 21 includes one or more interfaces for communication. The interface for communication is, for example, a LAN interface. The communication interface 21 receives information to be used for the operations of the server apparatus 10 and transmits information obtained by the operations of the server apparatus 10. The server apparatus 10 is connected to the network 11 by the communication interface 21 and communicates information with the aircraft 12 or the terminal apparatus 13 via the network 11.

The memory 22 includes, for example, one or more semiconductor memories, one or more magnetic memories, one or more optical memories, or a combination of at least two of these types, to function as main memory, auxiliary memory, or cache memory. The semiconductor memory is, for example, random access memory (RAM) or read only memory (ROM). The RAM is, for example, static RAM (SRAM) or dynamic RAM (DRAM). The ROM is, for example, electrically erasable programmable ROM (EEPROM). The memory 22 stores information to be used for the operations of the server apparatus 10 and information obtained by the operations of the server apparatus 10.

The controller 23 includes one or more processors, one or more dedicated circuits, or a combination thereof. The processor is a general purpose processor, such as a central processing unit (CPU), or a dedicated processor, such as a graphics processing unit (GPU), specialized for a particular process. The dedicated circuit is, for example, a field-programmable gate array (FPGA), an application specific integrated circuit (ASIC), or the like. The controller 23 executes information processing related to operations of the server apparatus 10 while controlling components of the server apparatus 10.

The input interface 25 includes one or more interfaces for input. The interface for input is, for example, a physical key, a capacitive key, a pointing device, a touch screen integrally provided with a display, or a microphone that receives audio input. The input interface 25 accepts operations to input information used for operation of the server apparatus 10 and transmits the inputted information to the controller 23.

The output interface 26 includes one or more interfaces for output. The interface for output is, for example, a display or a speaker. The display is, for example, a liquid crystal display (LCD) or an organic electro-luminescent (EL) display. The output interface 26 outputs information obtained by the operations of the server apparatus 10.

The functions of the server apparatus 10 are realized by a processor included in the controller 23 executing a control program. The control program is a program for causing a computer to function as the server apparatus 10. Some or all of the functions of the server apparatus 10 may be realized by a dedicated circuit included in the controller 23. The control program may be stored on a non-transitory recording/storage medium readable by the server apparatus 10 and be read from the medium by the server apparatus 10.

Figure 3:
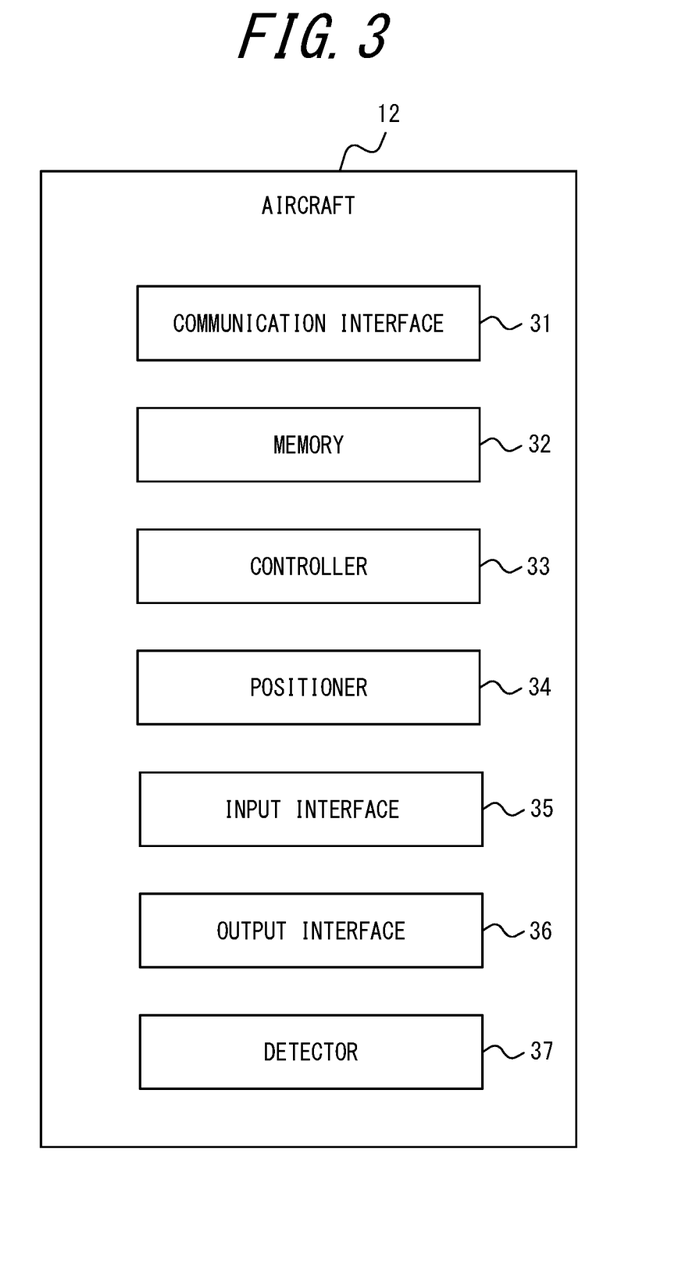
FIG. 3 is a diagram illustrating an example configuration of an aircraft.

FIG. 3 illustrates an example configuration of the aircraft 12. The aircraft 12 includes a communication interface 31, a memory 32, a controller 33, a positioner 34, an input interface 35, an output interface 36, and a detector 37. One or more of these may be configured as a single control apparatus, or each component may be connected via an on-board network in the aircraft 12 to enable communication of information. The control apparatus may also be configured by a personal computer including a tablet terminal, a smartphone terminal, a navigation apparatus, or the like.

The communication interface 31 includes one or more interfaces for communication. Examples of the interface for communication include an interface corresponding to mobile communication standards, such as Long Term Evolution (LTE), 4th Generation (4G), or 5th Generation (5G). The communication interface 31 receives information to be used for the operations of the controller 33 and transmits information obtained by the operations of the controller 33. The controller 33 connects to the network 11 using the communication interface 31 through a mobile communication base station and communicates information with the server apparatus 10 via the network 11.

The memory 32 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 32 functions as, for example, a main memory, an auxiliary memory, or a cache memory. The memory 32 stores information to be used for the operations of the controller 33 and information obtained by the operations of the controller 33.

The controller 33 includes one or more processors, one or more dedicated circuits, or a combination thereof. Examples of the processor include a general purpose processor such as a CPU and a dedicated processor dedicated to specific processing. The dedicated circuit is, for example, an FPGA or an ASIC. The controller 33 executes information processing pertaining to operations of the aircraft 12.

The positioner 34 includes a sensor or receiver for acquiring the position of the aircraft 12 by autonomous navigation, electronic navigation, a global navigation satellite system (GNSS), or the like. Sensors for autonomous navigation include, for example, accelerometers, gyro-sensors, compasses, altimeters, and the like. Receivers for electronic navigation include, for example, VHF omni-directional radio range (VOR), instrument landing system (ILS), and other receivers for receiving radio waves from ground-based radio facilities. Furthermore, GNSS receives include, for example, at least one of Global Positioning System (GPS), Quasi-Zenith Satellite System (QZSS), BeiDou, Global Navigation Satellite System (GLONASS), and Galileo. The positioner 34 acquires the positional information for the aircraft 12 and transmits the positional information to the controller 33.

The input interface 35 includes one or more interfaces for input. The interface for input is, for example, a physical key, a capacitive key, a pointing device, a touch screen integrally provided with a display, or a microphone that receives audio input. The interface for input may further include a camera or integrated circuit (IC) card reader that captures images or image codes. The input interface 35 accepts operations for inputting information to be used in the operations of the controller 33 and transmits the inputted information to the controller 33.

The output interface 36 includes one or more interfaces for output. The interface for output is, for example, a display or a speaker. The display is, for example, an LCD or an organic EL display. The output interface 36 outputs information obtained by the operations of the controller 33.

The detector 37 includes one or more sensors, or interfaces with sensors, that detect the condition or operation of various components in the aircraft 12 and transmits information indicating the results of detection by the sensors to the controller 33. The sensors include sensors that detect the state or operation of drive mechanisms including motors, remaining battery charge, temperature, and the like. The sensors also include wind speed sensors, wind direction sensors, air temperature sensors, air pressure sensors, humidity sensors, illumination sensors, rainfall sensors, cameras, and other sensors that detect conditions in the environment external to the aircraft 12.

The functions of the controller 33 are realized by a processor included in the controller 33 executing a control program. The control program is a program for causing the processor to function as the controller 33. Some or all of the functions of the controller 33 may be realized by a dedicated circuit included in the controller 33.

The controller 33 controls each of the communication interface 31, the memory 32, the positioner 34, the input interface 35, the output interface 36, and the detector 37 while exchanging various information with these components and also presents various information necessary for piloting the aircraft 12 to the pilot via the output interface 36.

Figure 4:
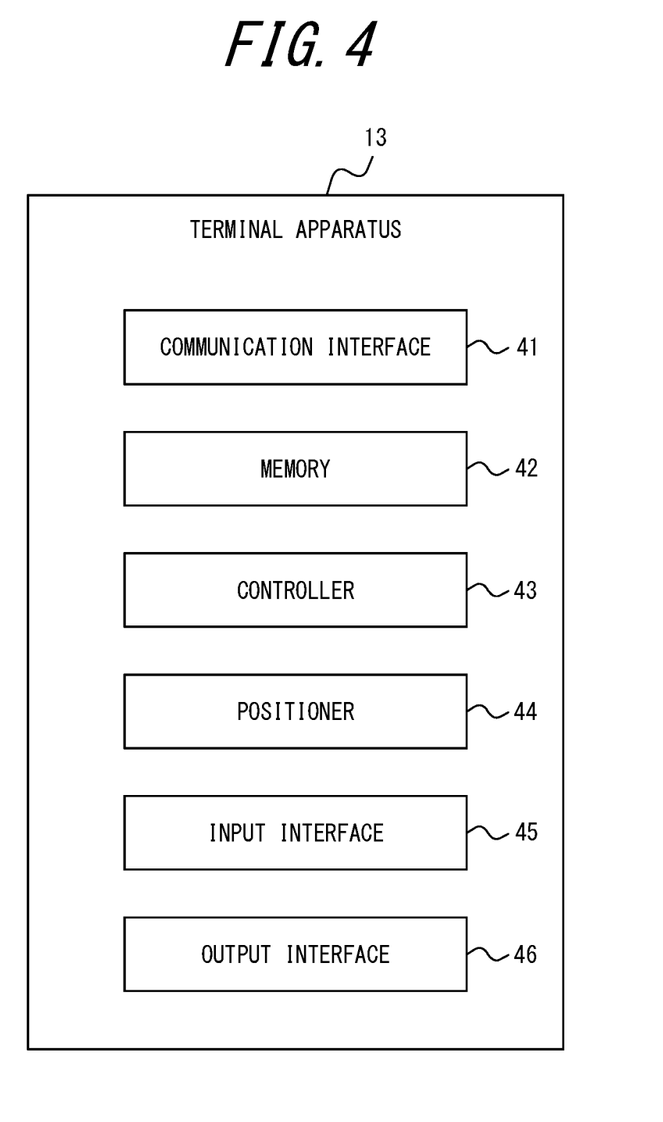
FIG. 4 is a diagram illustrating a configuration example of a terminal apparatus.

FIG. 4 is a diagram illustrating a configuration of the terminal apparatus 13. The terminal apparatus 13 is, for example, an information processing apparatus such as a smartphone, a tablet terminal, or the like. The terminal apparatus 13 includes a communication interface 41, a memory 42, a controller 43, a positioner 44, an input interface 45, and an output interface 46.

The communication interface 41 includes a communication module compliant with a wired or wireless LAN standard, a module compliant with a mobile communication standard such as LTE, 4G, or 5G, or the like. The terminal apparatus 13 connects to the network 11 via a nearby router apparatus or mobile communication base station using the communication interface 41 and communicates information with the server apparatus 10 and the like over the network 11.

The memory 42 includes, for example, one or more semiconductor memories, one or more magnetic memories, one or more optical memories, or a combination of at least two of these types. The semiconductor memory is, for example, RAM or ROM. The RAM is, for example, SRAM or DRAM. The ROM is, for example, EEPROM. The memory 42 functions as, for example, a main memory, an auxiliary memory, or a cache memory. The memory 42 stores information to be used for the operations of the controller 43 and information obtained by the operations of the controller 43.

The controller 43 has one or more general purpose processors such as CPUs or micro processing units (MPUs) or one or more dedicated processors that are dedicated to specific processing. Alternatively, the controller 43 may have one or more dedicated circuits such as FPGAs or ASICs. The controller 43 is configured to perform overall control of the operations of the terminal apparatus 13 by operating according to the control/processing programs or operating according to operation procedures implemented in the form of circuits. The controller 43 then transmits and receives various types of information to and from the server apparatus 10 and the like via the communication interface 41 and executes the operations according to the present embodiment.

The positioner 44 includes one or more GNSS receivers. GNSS includes, for example, GPS, QZSS, BeiDou, GLONASS, and/or Galileo. The positioner 44 acquires positional information for the terminal apparatus 13.

The input interface 45 includes one or more interfaces for input. The interface for input is, for example, a physical key, a capacitive key, a pointing device, a touch screen integrally provided with a display, or a microphone that receives audio input. The interface for input may further include a camera or IC card reader that captures images or image codes. The input interface 45 accepts operations for inputting information to be used in the operations of the controller 43 and transmits the inputted information to the controller 43.

The output interface 46 includes one or more interfaces for output. The interface for output is, for example, a display or a speaker. The display is, for example, an LCD or an organic EL display. The output interface 46 outputs information obtained by the operations of the controller 43.

The functions of the controller 43 are realized by a processor included in the controller 43 executing a control program. The control program is a program for causing the processor to function as the controller 43. Some or all of the functions of the controller 43 may be realized by a dedicated circuit included in the controller 43.

Figure 5:
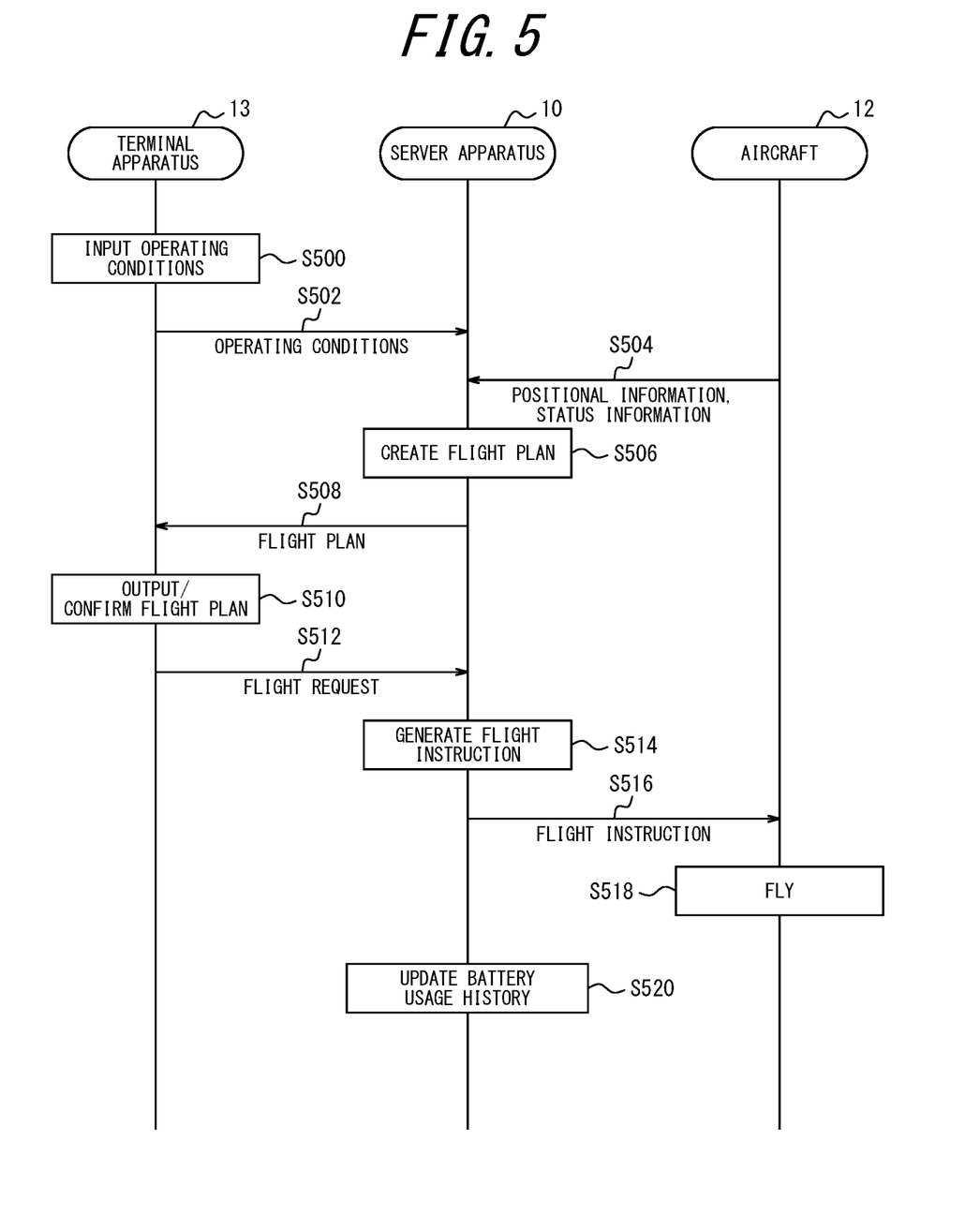
FIG. 5 is a sequence diagram illustrating an operation example of the operation management system.

FIG. 5 is a sequence diagram illustrating the operation procedures of the operation management system 1. This sequence diagram illustrates the steps in the coordinated operation of the server apparatus 10, the aircraft 12, and the terminal apparatus 13. The steps pertaining to the various information processing by the server apparatus 10, the aircraft 12, and the terminal apparatus 13 in FIG. 5 are performed by the respective controllers 23, 33, 43. The steps pertaining to transmitting and receiving various types of information to and from the server apparatus 10, the aircraft 12, and the terminal apparatus 13 are performed by the respective controllers 23, 33, 43 transmitting and receiving information to and from each other via the respective communication interfaces 21, 31, 41. In the server apparatus 10, the aircraft 12, and the terminal apparatus 13, the respective controllers 23, 33, 43 appropriately store the information that is transmitted and received in the respective memories 22, 32, 42. Furthermore, the controllers 23, 33, 43 accept input of various information by the respective input interfaces 25, 35, 45 and output various information by the respective output interfaces 26, 36, 46. Although an example of the procedures for the server apparatus 10 to operate in coordination with one aircraft 12 and one terminal apparatus 13 are illustrated, the procedures in FIG. 5 may be performed by the server apparatus 10 in coordination with two or more of each of the aircraft 12 and the terminal apparatus 13.

In step S500, the terminal apparatus 13 accepts input of operating conditions from the passenger. The operating conditions include information such as the number of passengers traveling on the aircraft 12 and the departure location, departure time, destination, arrival time, and the like specified by the passengers. The controller 53 controls the output interface 56 to display an operating condition input screen and controls the touch panel or the like that forms the input interface 45 to accept information inputted by the passenger.

In step S502, the terminal apparatus 13 transmits information on the operating conditions to the server apparatus 10. The server apparatus 10 receives the information transmitted from the terminal apparatus 13.

In step S504, the server apparatus 10 receives positional information and status information for the aircraft 12 from the aircraft 12. The status information includes information such as the current and the temperature of the motor in the aircraft 12 and the remaining charge of the battery that supplies power to the motor. For example, the aircraft 12 transmits the positional information and the status information to the server apparatus 10 at any appropriate period (for example, a period of a few seconds). Alternatively, the server apparatus 10 may request the positional information and the status information from the aircraft 12 and the aircraft 12 may transmit the positional information and the status information to the server apparatus 10 in response to the request. Identification information for the aircraft 12 is included with the positional information and the status information. This enables the server apparatus 10 to associate the identification information with the positional information and the status information for each aircraft 12, even in a case in which a plurality of aircraft 12 exists.

In step S506, the server apparatus 10 creates a flight plan. The detailed operation procedures for the controller 23 in step S506 are illustrated in FIG. 6.

Figure 6:
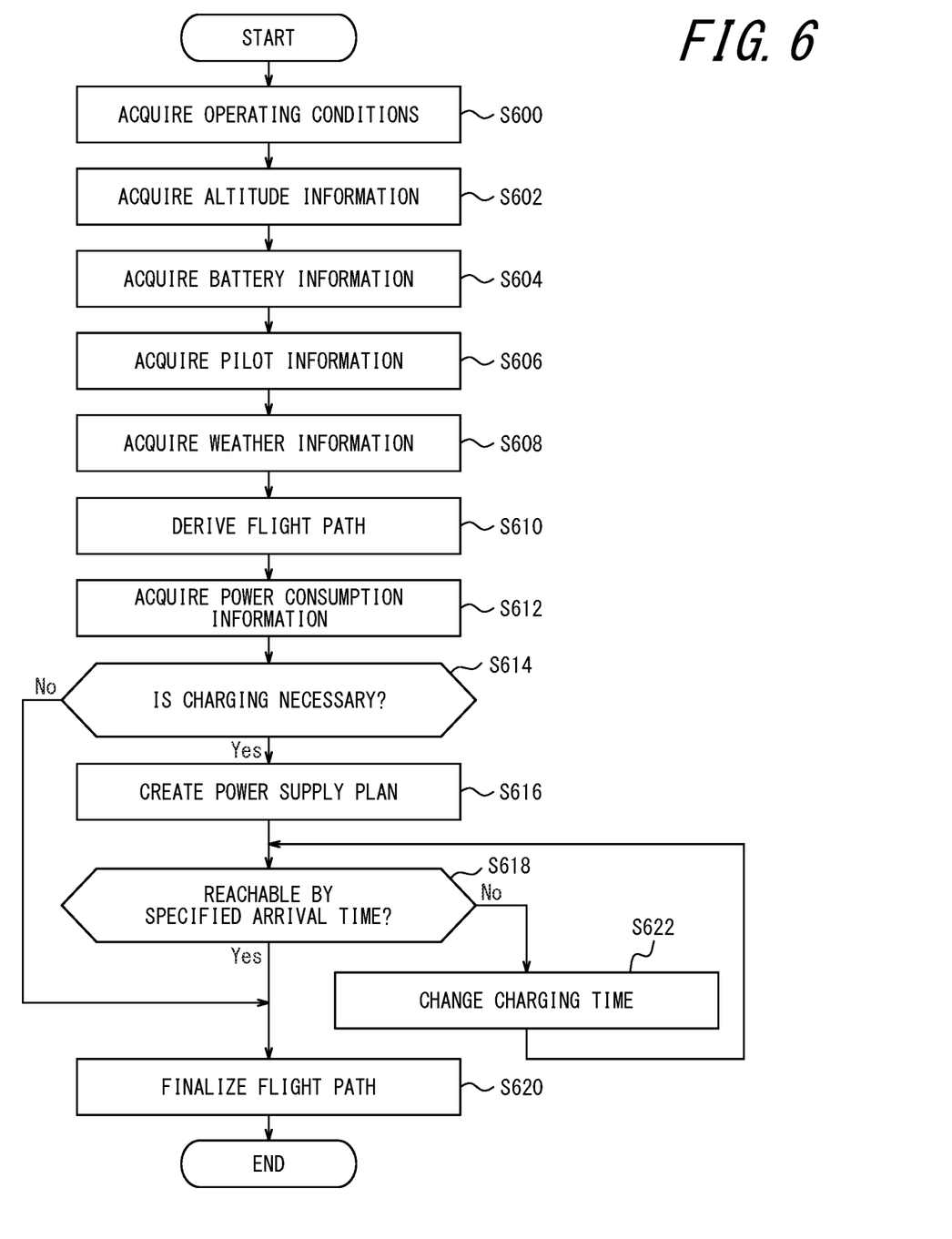
FIG. 6 is a flowchart illustrating an operation example of the server apparatus.

FIG. 6 is a flowchart illustrating an example of the operation procedures for the controller 23 in the server apparatus 10.

In step S600, the controller 23 acquires the operating conditions. The controller 23 reads the operating conditions received from the terminal apparatus 13 from the memory 22.

In step S602, the controller 23 acquires altitude information. For example, for each unit area of any size on the map, the altitude information includes information on the flight altitude required of the aircraft 12 according to the state of the unit area. The state of the unit area is the density of people, buildings, and the like, or the elevation of the ground surface. Here, the flight altitude is the altitude above sea level. The aircraft 12 is required to fly at least 150 m above ground surface objects in the airspace over non-dense areas and at least 300 m above ground surface objects in the airspace over dense areas. Furthermore, the elevation of the ground surface is added to or subtracted from the required distance from the ground surface. Accordingly, the flight altitude, or altitude above sea level, required for the aircraft 12 varies depending on the state of the unit area over which the aircraft 12 flies. When flying along the flight path, the aircraft 12 therefore ascends or descends as needed to fly at a flight altitude that varies according to the state of the unit area over which the aircraft 12 flies. Such altitude information is stored in advance in the memory 22 together with map information. The controller 23 reads the altitude information for the areas corresponding to the departure point and the destination included in the operating conditions.

Figure 7A:
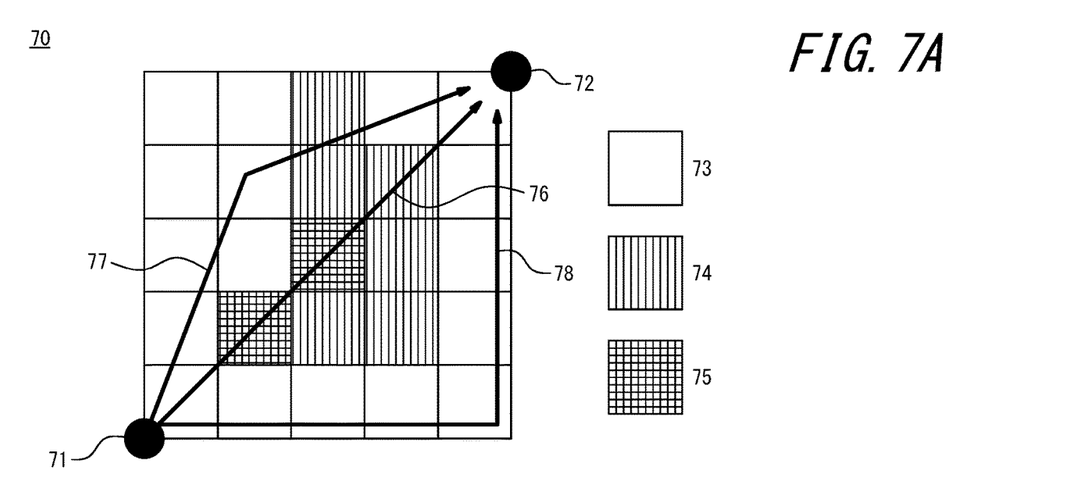
FIG. 7A is a diagram illustrating examples of altitude information and flight paths.

FIG. 7A schematically illustrates an example of altitude information. For example, the controller 23 reads the altitude information for a rectangular area 70, with a departure point 71 and a destination 72 as opposite corners, from the memory 22. The rectangular area 70 has unit areas represented by blank or hatched squares. Each unit area is, for example, a rectangular area of several tens to several hundreds of meters square. Here, the unit areas are classified into a low altitude area 73, a medium altitude area 74, and a high altitude area 75, in order of the flight altitude required for the aircraft 12 flying over the areas. The low altitude area 73 corresponds to an area for which a flight altitude of at least 150 m is required, for example, and which is a ground surface with no concentration of people, buildings, vehicles, or the like, or a water surface with no concentration of ships or the like. The medium altitude area 74 corresponds to an area for which a flight altitude of at least 200 meters is required, for example, and in which the flight altitude is specified by air traffic control, for example. The high altitude area 75 corresponds to an area for which a flight altitude of at least 300 m is required, for example, and which is a ground surface with a high concentration of people, buildings, vehicles, or the like, or a water surface with a high concentration of ships or the like. Whether the concentration is high is, for example, determined according to whether the population, number of buildings, number of vehicles, number of ships, or the like in each unit area meets an appropriately set threshold. The altitude information illustrated here is only an example. In a mountainous area or other unit area with relatively high elevation, for example, a flight altitude of several hundred meters or more with added elevation may be required.

In step S604 of FIG. 6, the controller 23 acquires battery information. The controller 23 acquires the battery information, including the remaining charge of the battery, from the status information received from the aircraft 12.

In step S606, the controller 23 acquires pilot information. The controller 23 reads the pilot information corresponding to the identification information received from the aircraft 12 from the memory 22. Pilot information corresponding to each piece of identification information for the aircraft 12 is stored in advance in the memory 22. The pilot information includes identification information for a pilot and information indicating the proficiency level of the pilot. The information indicating proficiency includes, for example, cumulative training hours, cumulative flight hours, and whether the pilot is certified in piloting techniques. Such pilot information is entered and stored in the server apparatus 10 once, for example, by the operator and is updated as needed.

In step S608, the controller 23 acquires weather information. The weather information includes, for example, information on the wind direction for each unit area. The controller 23 acquires the weather information corresponding to the rectangular area 70 from a server that distributes weather information, for example, and acquires information on the wind direction for each unit area.

In step S610, the controller 23 derives the flight path. The controller 23 uses any appropriate algorithm to derive a flight path from the current position of the aircraft 12 to the departure point, and then from the departure point to the destination. For example, FIG. 7A illustrates examples of three flight paths 76, 77, 78 from the departure point 71 to the destination 72.

Figure 7B:
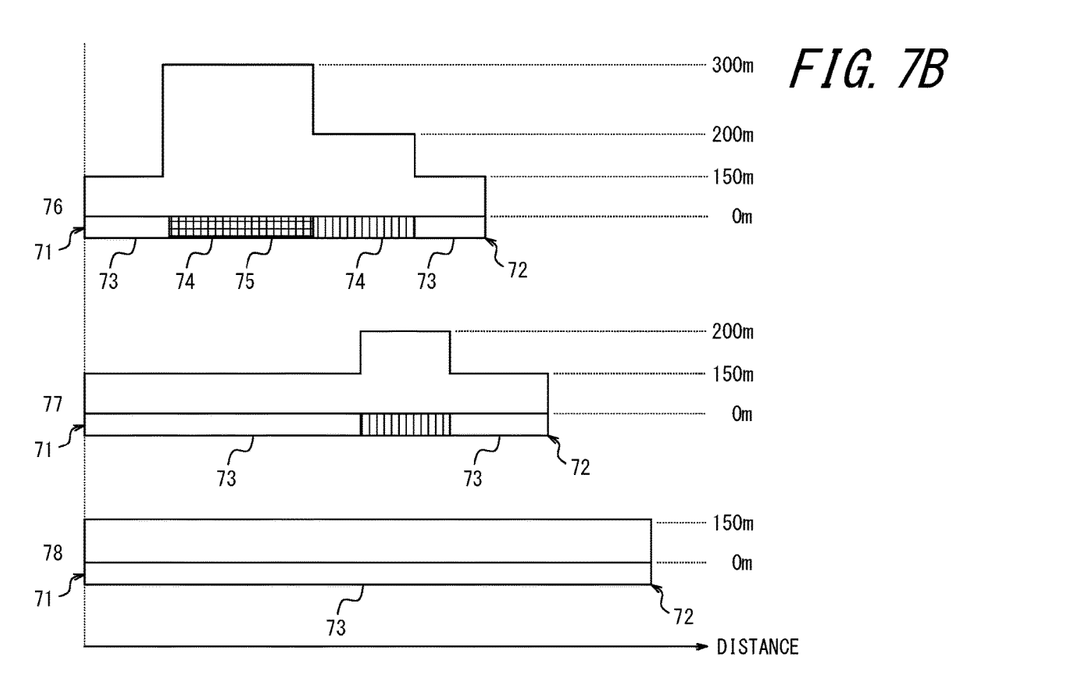
FIG. 7B is a diagram illustrating examples of flight paths.

FIG. 7B schematically illustrates the changes in flight altitude for each of the three flight paths 76, 77, 78 in FIG. 7A. The vertical axis of FIG. 7B represents the flight altitude, and the horizontal axis represents the unit area to be passed through and the flight distance.

For example, the flight path 76 passes from the departure point 71 through a low altitude area 73, high altitude areas 75, and a medium altitude area 74, and then passes again through a low altitude area 73 to reach the destination 72. The flight altitude required for the aircraft 12 thus varies sequentially from 0 m at the departure point 71, to 150 m at the low altitude area 73, 300 m at the high altitude areas 75, 200 m at the medium altitude area 74, 150 m at the low altitude area, and 0 m at the destination 72. Therefore, in this case, the total change in altitude due to the ascent and descent of the aircraft 12 is 600 m, i.e., the sum of 300 m for the ascent and 300 m for the descent.

The flight path 77 passes from the departure point 71 through low altitude areas 73 and medium altitude areas 74, and then passes again through low altitude areas 73 to reach the destination 72. The flight altitude required for the aircraft 12 thus varies sequentially from 0 m at the departure point 71, to 150 m at the low altitude areas 73, 200 m at the medium altitude areas 74, 150 m at the low altitude areas, and 0 m at the destination 72. Therefore, in this case, the total change in altitude due to the ascent and descent of the aircraft 12 is 400 m.

Furthermore, the flight path 78 passes from the departure point 71 only through low altitude areas 73 to reach the destination 72. The flight altitude required for the aircraft 12 thus varies sequentially from 0 m at the departure point 71, to 150 m at the low altitude areas 73, and 0 m at the destination 72. Therefore, in this case, the total change in altitude due to the ascent and descent of the aircraft 12 is 300 m.

As illustrated in the examples in FIGS. 7A and 7B, the amount of change in flight altitude depends on the flight path. The electric rotor of the aircraft 12 is driven by a motor, and when the aircraft 12 flies, the motor is subjected to a relatively large load during vertical ascent and descent, resulting in a large power consumption. Therefore, the power consumption for each flight path differs depending not only on the flight distance but also the amount of the change in flight altitude.

In step S612 of FIG. 6, the controller 23 acquires power consumption information. The power consumption information is information on the power consumption for the flight of the aircraft 12. The power consumption information is stored in the memory 22 in advance. The power consumption information includes power consumption values that vary according to the flight conditions of the aircraft 12. The flight conditions include the flight distance along the flight path, the amount of change in flight altitude, the wind direction, the pilot's flying skill, and the like.

Figure 8:
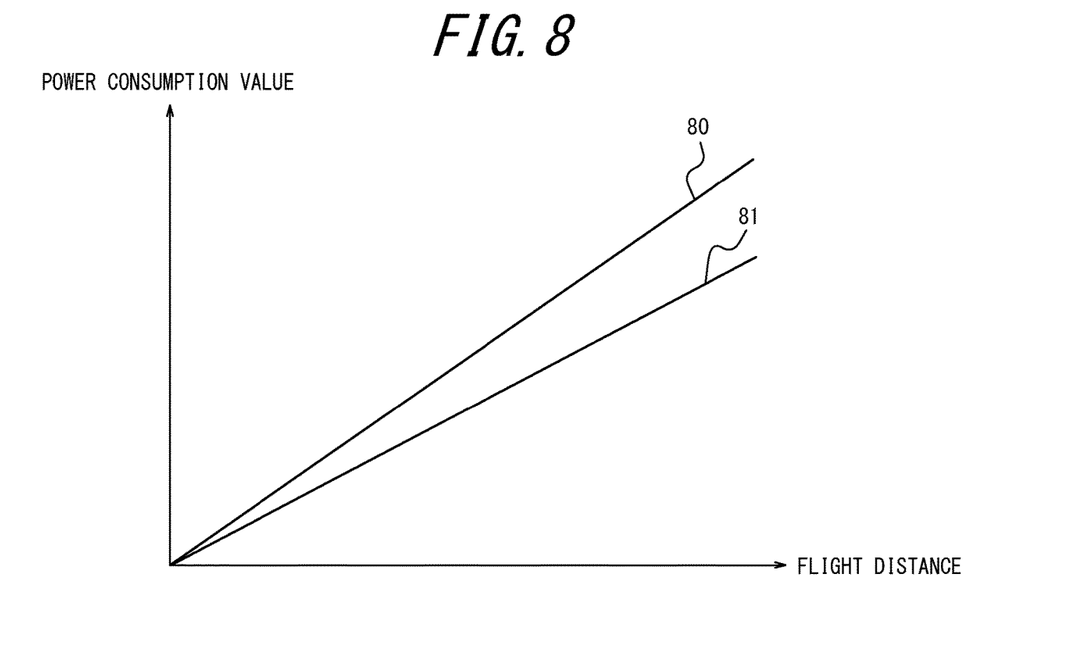
FIG. 8 is a diagram illustrating the power consumption of an aircraft.

FIG. 8 schematically illustrates the correspondence between flight conditions and power consumption values in the power consumption information. The horizontal axis in FIG. 8 represents the flight distance, and the vertical axis represents the power consumption value. The correspondence between the flight distance and the power consumption value for a relatively large and a relatively small amount of change in flight altitude are illustrated respectively by correspondences 80 and 81. As illustrated by the correspondences 80 and 81, the power consumption values increase with increasing flight distance. For the same flight distance, the power consumption value is higher as the amount of change in flight altitude is greater. Furthermore, the power consumption value varies depending on the direction of the wind to which the aircraft 12 is subjected. When the aircraft 12 receives a headwind during ascent or descent, additional lift is obtained, reducing the load on the motor compared to the case of no headwind and lowering the power consumption value. Furthermore, the power consumption value varies depending on the pilot's flying skill. The better the pilot's flying skill, the less power is wasted, and thus the lower the power consumption value.

In step S614 of FIG. 6, the controller 23 uses the power consumption and the remaining charge of the aircraft 12 to determine whether charging is required en route in a case in which the aircraft 12 flies according to the derived flight path. The controller 23 derives the flight conditions of the aircraft 12 on the derived flight path, i.e., the flight distance, the amount of change in flight altitude, the wind direction, the pilot's flying skill, and the like, and derives the power consumption corresponding to these factors from the power consumption information. The controller 23 then derives the increase in power consumption due to the flight of the aircraft 12 and derives the decrease in the remaining charge corresponding to the increase in power consumption. In a case in which the aircraft 12 is expected to have an appropriately set minimum remaining charge at the time the aircraft 12 arrives at the destination, the controller 23 determines that charging is not required. The minimum remaining charge is the remaining charge required for the aircraft 12 to fly from the destination to the nearest power supply facility. The controller 23 searches for the power supply facility nearest to the destination and uses the power consumption information to derive the minimum remaining charge corresponding to the distance from the destination to the nearest power supply facility. The controller 23 determines that charging is necessary in a case in which the aircraft 12 is expected not to have the minimum remaining charge upon arrival at the destination. The controller 23 advances to step S620 in a case in which charging is unnecessary (No) and to step S616 in a case in which charging is necessary (Yes).

In step S616, the controller 23 generates a power supply plan. Creation of the power supply plan includes identifying the power supply facility at which the aircraft 12 can charge, changing to a flight path that passes through the identified power supply facility, and determining the charging time at the power supply facility.

The controller 23 retrieves power supply facilities near the current position or flight path of the aircraft 12 from the map information and derives the flight path from the current position or departure point of the aircraft 12 for each retrieved power supply facility. Based on the power consumption value corresponding to the flight conditions for each flight path and the remaining charge, the controller 23 identifies the power supply facility that can be reached at the earliest possible timing with the remaining charge of the aircraft 12.

Figure 9:
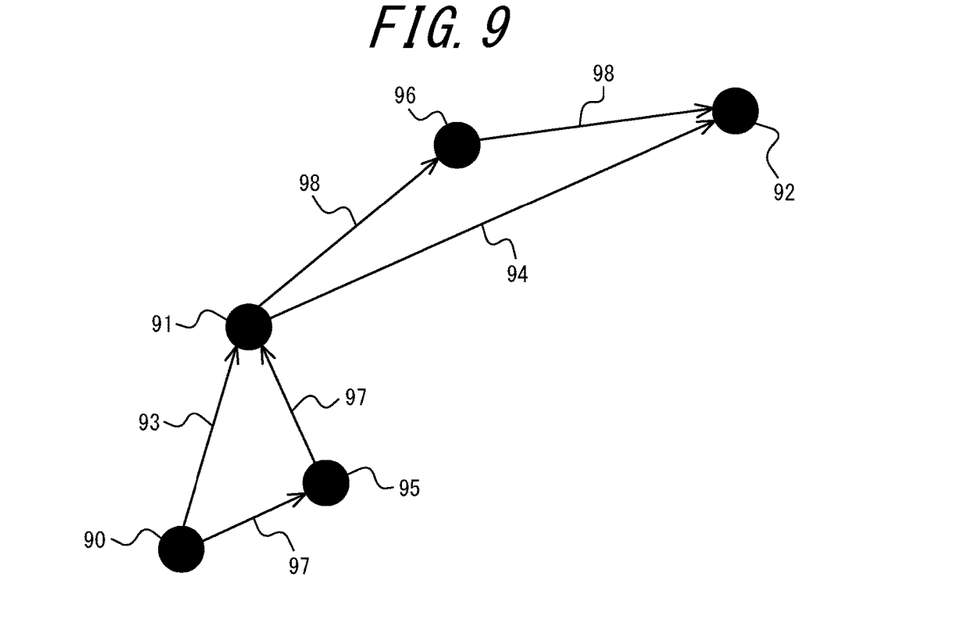
FIG. 9 is a diagram illustrating examples of flight paths.

Furthermore, the controller 23 modifies the original flight path to pass through the identified power supply facility. For example, as illustrated in FIG. 9, in a case in which initial flight paths 93, 94 are derived from the current position 90 of the aircraft 12 to the departure point 91 and from the departure point 91 to the destination 92, respectively, and a power supply facility 95 is identified as being the nearest to the current position 90, then the flight path 93 is changed to a flight path 97 that passes through the power supply facility 95. Alternatively, in a case in which a power supply facility 96 is identified as being the nearest to the flight path 94, the flight path 94 is changed to a flight path 98 that passes through the power supply facility 96.

Furthermore, the controller 23 derives the remaining charge of the aircraft 12 at the time the aircraft 12 flies to and arrives at the identified power supply facility, and the controller 23 derives the charging time for a full charge. For example, the controller 23 derives the charging time assuming that fast charging is performed when the remaining charge is within the range of 20% to 80% and slow charging is performed when the remaining charge is outside the range of 20% to 80%. The memory 22 stores information on battery specifications for each aircraft 12 in advance. Using this information, the controller 23 derives the charging time. In this way, battery degradation can be suppressed by switching between fast and slow charging according to the remaining charge level.

In step S618, the controller 23 determines whether the aircraft 12 can arrive at the destination by a specified arrival time by flying according to the derived flight path. The controller 23 derives the arrival time of the aircraft 12 from the standard flight speed of the aircraft 12, which is set appropriately, and the travel distance. In a case in which the destination is reachable by the specified arrival time (Yes), the controller 23 proceeds to step S620 and finalizes the flight plan. On the other hand, in a case in which the destination is not reachable by the specified arrival time (No), the controller 23 proceeds to step S614 and changes the charging time at the power supply facility. For example, the controller 23 reduces the charging time by reducing the target remaining charge by a reduction amount appropriately set in advance. The controller 23 then changes to a charging time that enables arrival by the specified arrival time (Yes in step S618) and finalizes the flight plan in step S620. In this way, the battery of the aircraft 12 is charged, and the possibility of arrival by the specified arrival time is ensured, thus contributing to passenger convenience.

Returning to FIG. 5, in step S508, the server apparatus transmits information on the flight plan to the terminal apparatus 13. The flight plan includes information on the flight path from the point of departure to the destination, the estimated departure time, the estimated arrival time, and the like.

In step S510, the terminal apparatus 13 outputs the flight plan and accepts input of confirmation from the passenger. The controller 43 controls the output interface 46 to display the flight plan and a confirmation input screen. The passenger reviews the flight plan and inputs confirmation in a case in which the passenger wishes to board the aircraft 12 with that flight plan. The controller 43 controls the touch panel or the like that forms the input interface 45 to accept the information inputted by the passenger.

In step S512, the terminal apparatus 13 transmits information on a flight request to the server apparatus 10. The information on the flight request includes passenger information. The passenger information includes the name, address, date of birth, user registration number, user account information, and the like for identifying the passenger. The passenger information may be stored in advance in the memory 42 as user registration information or may be inputted by the passenger to the terminal apparatus 13. The server apparatus 10 receives the information transmitted from the terminal apparatus 13.

In step S516, the server apparatus 10 generates a flight instruction corresponding to the confirmed and requested flight plan. Then, in step S516, the server apparatus 10 transmits the flight instruction to the aircraft 12. The flight instruction includes the information necessary to fly according to the flight path. The flight instruction includes information such as the flight path, flight altitude, departure point and destination, location of the power supply facility to pass through, and the time to be spent charging at the power supply facility. The aircraft 12 receives the information transmitted from the server apparatus 10.

In step S518, the aircraft 12 flies based on the flight instruction from the server apparatus 10. The aircraft 12 outputs the information necessary for flight using a display or the like to present the information to the pilot, who flies the aircraft 12 by piloting in accordance with the flight instruction.

In step S520, the server apparatus 10 updates a battery usage history. The battery usage history is, for example, a score indicating the degree of battery depletion, corresponding to the power consumption when the aircraft 12 flew in accordance with the flight instruction. The usage history is stored in the memory 22 in advance. The controller 23 updates the score indicating the degree of battery depletion according to the flight instruction provided to the aircraft 12.

By storing and updating the battery usage history, the server apparatus 10 can use the battery usage history to notify the operation service provider of battery inspection, replacement, and the like. For example, the controller 23 can transmit a notification to an information processing apparatus of the operation service provider when the score in the battery usage history reaches an appropriately set threshold, or approaches the threshold to a certain degree, to encourage inspection and replacement of the battery in the aircraft 12.

According to the present embodiment, the charging and discharging of the battery of the aircraft 12 can be more reasonably managed. In turn, charging and discharging that needlessly accelerates the degradation of the battery of the aircraft 12 is avoided, thereby maintaining the aircraft 12 in a good operating state. This also enables recognition of the degree of battery depletion and ensures predictability of inspections, replacements, and the like.

The controller 23 may take into account the motor status acquired from the aircraft 12 when deriving the power consumption of the aircraft 12 in step S614 to derive the remaining charge. For example, in a case in which the motor temperature is higher than an appropriately set standard, and the power consumption is estimated to be high, the power consumption value can be corrected to be larger.

The controller 23 may take into account the battery usage history of the aircraft 12 when creating a charging plan for the aircraft 12 in step S616. For example, in a case in which the score indicating the battery usage history is higher than an appropriately set standard, and a certain degree of battery depletion is estimated, the target charge amount can be corrected to be smaller.

In the above explanation, the server apparatus 10 corresponds to a "control apparatus". However, at least some of the information processing by the control apparatus may be performed by the aircraft 12. In other words, the controller 33 of the aircraft 12 may be responsible for some or all of the above-described operations of the server apparatus 10, either together with or instead of the server apparatus 10.

While embodiments have been described with reference to the drawings and examples, it should be noted that various modifications and revisions may be implemented by those skilled in the art based on the present disclosure. Accordingly, such modifications and revisions are included within the scope of the present disclosure. For example, functions or the like included in each means, each step, or the like can be rearranged without logical inconsistency, and a plurality of means, steps, or the like can be combined into one or divided.

The invention claimed is:

1. A control apparatus comprising:
a memory storing information on power consumption for flight of an aircraft flying by an electric rotor; and
a controller configured to instruct the aircraft to fly on a flight path passing through a power supply facility based on a remaining charge of the aircraft and the power consumption according to flight conditions when the aircraft flies to a destination,
wherein the flight conditions include a total change in flight altitude based on information about an altitude required for the aircraft in each unit area.

2. The control apparatus according to claim 1, wherein the controller transmits an instruction to the aircraft to charge at the power supply facility at a charging rate corresponding to the remaining charge.

3. The control apparatus according to claim 1, wherein the controller transmits an instruction to the aircraft to reduce a charging time at the power supply facility in a case in which the aircraft will not arrive at the destination by a specified arrival time.

4. The control apparatus according to claim 3, wherein the controller generates the instruction to reduce the charging time by taking into account a status of a battery of the aircraft.

5. The control apparatus according to claim 1, wherein the flight conditions include flight distance and/or weather.

6. The control apparatus according to claim 1, wherein the controller receives information on the destination from a terminal apparatus.

7. A non-transitory computer readable medium storing a program which, when executed by a computer, causes the computer to operate as the control apparatus according to claim 1.

8. An aircraft comprising the control apparatus according to claim 1.

9. A system comprising an aircraft flying by an electric rotor and a control apparatus communicating with the aircraft, wherein:
the control apparatus includes a memory storing information on power consumption for flight of the aircraft and a controller configured to instruct the aircraft to fly on a flight path passing through a power supply facility based on a remaining charge of the aircraft and the power consumption according to flight conditions when the aircraft flies to a destination,
the flight conditions include a total change in flight altitude based on information about an altitude required for the aircraft in each unit area, and
the aircraft flies based on an instruction from the controller.

10. The system according to claim 9, wherein the control apparatus transmits an instruction to the aircraft to charge at the power supply facility at a charging rate corresponding to the remaining charge.

11. The system according to claim 9, wherein the control apparatus transmits an instruction to the aircraft to reduce a charging time at the power supply facility in a case in which the aircraft will not arrive at the destination by a specified arrival time.

12. The system according to claim 11, wherein the control apparatus generates the instruction to reduce the charging time by taking into account a status of a battery of the aircraft.

13. The system according to claim 9, wherein the flight conditions include flight distance and/or weather.

14. The system according to claim 9, wherein the control apparatus receives information on the destination from a terminal apparatus.

15. An operating method of a system comprising an aircraft flying by an electric rotor and a control apparatus communicating with the aircraft, the operating method comprising:
storing, by the control apparatus, information on power consumption for flight of the aircraft and instructing the aircraft to fly on a flight path passing through a power supply facility based on a remaining charge of the aircraft and the power consumption according to flight conditions when the aircraft flies to a destination, wherein the flight conditions include a total change in flight altitude based on information about an altitude required for the aircraft in each unit area; and
flying, by the aircraft, based on an instruction from the control apparatus.

16. The operating method according to claim 15, wherein the control apparatus transmits an instruction to the aircraft to charge at the power supply facility at a charging rate corresponding to the remaining charge.

17. The operating method according to claim 15, wherein the control apparatus transmits an instruction to the aircraft to reduce a charging time at the power supply facility in a case in which the aircraft will not arrive at the destination by a specified arrival time.

18. The operating method according to claim 17, wherein the control apparatus generates the instruction to reduce the charging time by taking into account a status of a battery of the aircraft.

19. The operating method according to claim 15, wherein the flight conditions include flight distance and/or weather.

20. The operating method according to claim 15, wherein the control apparatus receives information on the destination from a terminal apparatus.

* * * * *